(12) United States Patent
Kitaji

(10) Patent No.: US 8,441,948 B2
(45) Date of Patent: May 14, 2013

(54) COMMUNICATION CONTROL APPARATUS, WIRELESS COMMUNICATION APPARATUS, COMMUNICATION CONTROL METHOD, AND WIRELESS COMMUNICATION METHOD

(75) Inventor: Mitsuhiro Kitaji, Yokohama (JP)

(73) Assignee: Kyocera Corporation, Kyoto (JP)

( * ) Notice: Subject to any disclaimer, the term of this patent is extended or adjusted under 35 U.S.C. 154(b) by 162 days.

(21) Appl. No.: 12/516,777

(22) PCT Filed: Nov. 28, 2007

(86) PCT No.: PCT/JP2007/072965
§ 371 (c)(1),
(2), (4) Date: Dec. 10, 2009

(87) PCT Pub. No.: WO2008/069076
PCT Pub. Date: Jun. 12, 2008

(65) Prior Publication Data
US 2010/0128616 A1    May 27, 2010

(30) Foreign Application Priority Data
Nov. 29, 2006  (JP) .................... 2006-322179

(51) Int. Cl.
*G01R 31/08* (2006.01)
(52) U.S. Cl.
USPC .......................... 370/252; 370/329
(58) Field of Classification Search ............ 370/252, 370/329, 232; 455/266
See application file for complete search history.

(56) References Cited

U.S. PATENT DOCUMENTS
7,738,395 B2 * 6/2010 Bang et al. .................... 370/253

| | | | |
|---|---|---|---|
| 2003/0157899 A1* | 8/2003 | Trossen et al. | 455/69 |
| 2004/0184483 A1* | 9/2004 | Okamura et al. | 370/477 |
| 2005/0169313 A1* | 8/2005 | Okamura et al. | 370/477 |
| 2007/0036106 A1* | 2/2007 | Karl et al. | 370/331 |
| 2007/0054645 A1* | 3/2007 | Pan | 455/266 |

FOREIGN PATENT DOCUMENTS

| | | |
|---|---|---|
| JP | 2000-134260 | 5/2000 |
| JP | 2000-216815 | 8/2000 |
| JP | 2005123993 A | 5/2005 |
| JP | 2005159873 A | 6/2005 |
| JP | 2005-244525 | 9/2005 |
| JP | 2006238144 A | 9/2006 |

OTHER PUBLICATIONS

C. Perkins, "IP Mobility Support (RFC2002)", Oct. 1996, ietf, www.ierf.org/rfc/rfc2002.txt.
Japanese language office action dated Oct. 18, 2011 and its English language translation for corresponding Japanese application 2006322179 cites the foreign patent documents above.
Japanese language office action dated May 8, 2012 and its English language translation issued in corresponding Japanese application 2006322179 cites the foreign patent document above.

* cited by examiner

*Primary Examiner* — David Oveissi
(74) *Attorney, Agent, or Firm* — DLA Piper LLP (US)

(57) ABSTRACT

In a transmission bandwidth notification /analysis unit (107), IP packets including a transmission bandwidth request is analyzed based on IP packets received by reception interface units (101Rx, 103Rx) and a transmission bandwidth notified from a mobile node (300) is notified to a transmission path control unit (113), and a transmission bandwidth field included in the received IP packets is monitored and a time from when a transmission bandwidth request has been sent to the mobile node (300) till when an IP packet reflecting the transmission bandwidth arrives is measured as well.

12 Claims, 6 Drawing Sheets

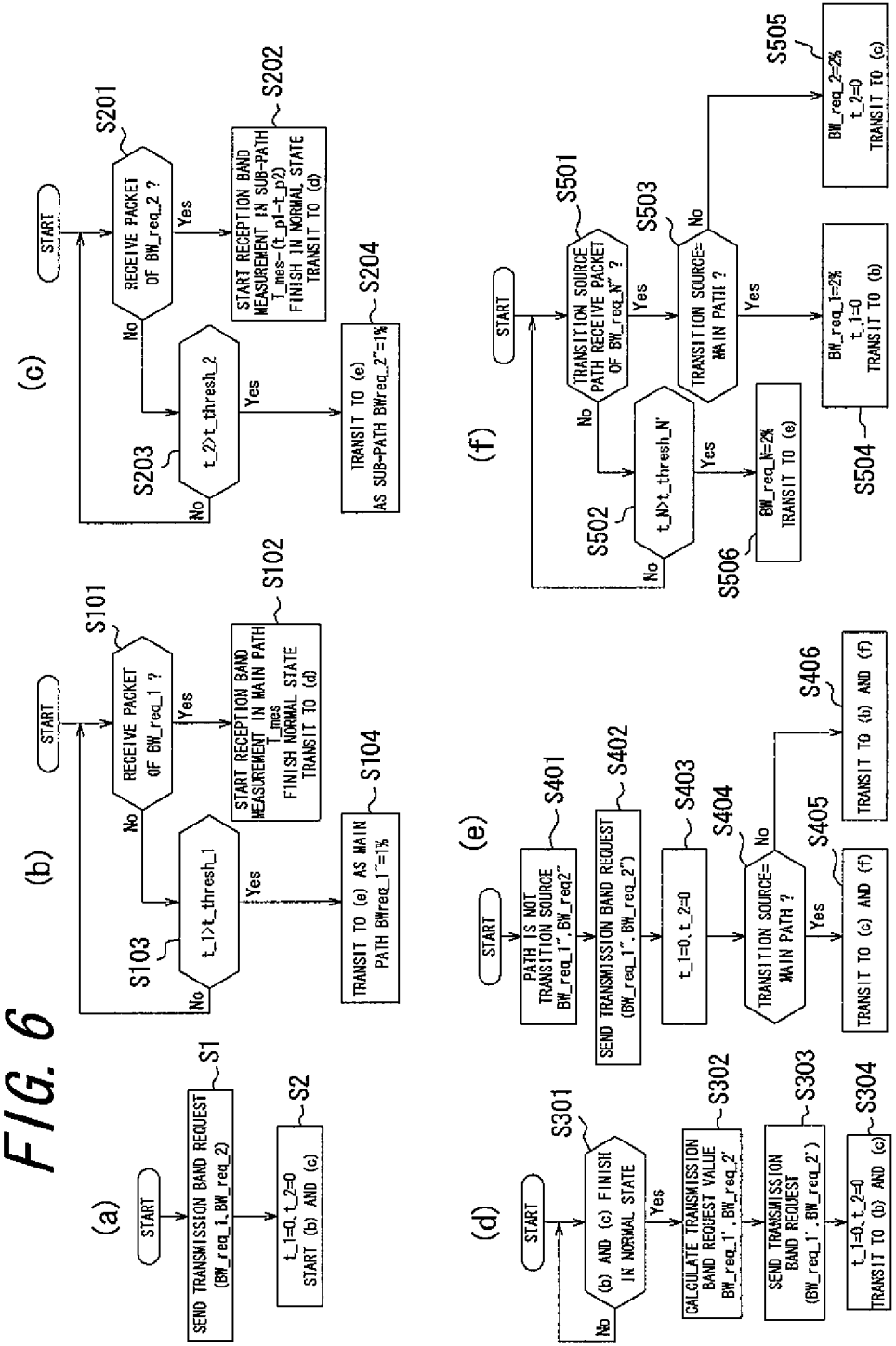

COMMUNICATION CONTROL APPARATUS, WIRELESS COMMUNICATION APPARATUS, COMMUNICATION CONTROL METHOD, AND WIRELESS COMMUNICATION METHOD

TECHNICAL FIELD

The present invention relates to a novel communication control apparatus, wireless communication apparatus, communication control method and wireless communication method capable of using a plurality of different wireless communication paths and performing communication by compensating for insufficient bandwidth of one wireless communication path with respect to a bandwidth required by a real-time application in use by another wireless communication path.

BACKGROUND ART

For example, in a wireless communication network using an Internet protocol (IP) group (hereinafter arbitrarily abbreviated as "wireless IP network"), so-called mobile IP is defined in order to improve mobility of wireless communication apparatus (e.g. non-patent literature 1).

The mobile IP uses a care-of IP address (Care of Address) that is dynamically allocated according to the location of wireless communication apparatus. Non-patent literature 1: C. Perkins, "IP Mobility Support (RFC2002)", [online], October 1996, IETF, [searched on Mar. 15, 2006], Internet <URL: http://www.ietf.org/rfc/rfc/2002.txt>.

SUMMARY OF INVENTION

Technical Problem

By the way, in these days, an environment where a wireless communication apparatus can use a plurality of wireless IP networks (e.g. a cellular phone network and a wireless LAN network) is gradually being provided.

In such an environment, with respect to a bandwidth required by a real-time application in use, it is possible to perform communication by compensating for insufficient bandwidth of one wireless communication path by another wireless communication path. In this case, it is assumed that a change message of transmission path ratio for compensating for an insufficient bandwidth of one wireless communication path by another wireless communication path is sent and received between a communication control apparatus and a wireless communication apparatus.

However, there is a time between sending of a change message and arrival of it to the corresponding party (a communication control apparatus or a wireless communication apparatus) and further, there is a time between sending of a packet from the corresponding party whose transmission ratio has been changed and reception of it. Therefore, after the change message has been sent, the transmission path ratio from the corresponding party will change after a delay of the sum of these times. Since the sum of these times changes according to fluctuations of communication bandwidth due to change of a wireless state and retention of transmission buffer on a sender side or the like, on a receiver side, it is not possible to accurately detect at which point of time the transmission path ratio has changed.

In the case where a reception bandwidth is measured and a transmission path ratio is calculated by allowing for a predetermined time (e.g. 500 ms) after a change message has been sent, because it's not that the reception bandwidth is measured after the transmission path ratio has actually been changed, time waste occurs from when the transmission ratio has actually been changed till when the reception bandwidth is measured. Therefore, it is not possible to respond to the situation where a traffic state changes suddenly.

FIG. 1 is a diagram for illustrating the case where a reception bandwidth is measured and a transmission path ratio is calculated by taking a predetermined time allowance (e.g. 500 ms) into account after a change message has been sent. Here, only one of a main path and a sub-path is shown. In this case, a measurement interval from the time when a transmission bandwidth request is sent as a change message after a measurement period of 500 ms till the next measurement is 500 ms. The black circles in FIG. 1 show a timing when the first packet that has been sent at a requested transmission bandwidth is received, which is usually a time (in the case of CDMA2000 1x EVDO, a little less than 200 ms, and in the case of WiMAX, equal to or less than 100 ms) of about RTT (Round Trip Time) when there is no problem with the communication state. Because of this, a large time lag occurs between the black circle and the next measurement period.

In addition, even if retention of a transmission buffer occurs due to deterioration of a wireless state of either the main path or the sub-path or sudden traffic congestion, such retention cannot be detected at least until the next measurement period. In the case where a communication bandwidth has become narrow suddenly due to occurrence of retention, on a receiver side, reduction of a communication bandwidth is checked after measurement of a reception bandwidth, and a transmission path ratio is notified based on the communication bandwidth. However, during this time, packets that are sent through a communication path whose communication bandwidth has suddenly become narrow are accumulated in the transmission buffer. Then as a result, in some cases, the packets that have been received through the communication path whose communication bandwidth has suddenly become narrow are accompanied by a substantial delay.

More specifically, in the case where retention occurs in the transmission buffer in either the main path or the sub-path, when packets are sent continuously to the path without noticing such retention on the sender side, the retention amount increases, which causes a substantial delay to all of the packets remained.

For example, assuming that packets of G711 (given a tunneling of UDP(User Datagram Packet), approx. 90 kbps) are sent at a ratio of 50% in either a main path or a sub-path, the packets accumulate in a transmission buffer at a speed of approx. 90 kbps×0.5≈45 kbps (the number of packets is 25).

When a wireless communication bandwidth falls to 10 kbps from this state, since only about 6 packets can be sent per second, about 19 packets will remain in the transmission buffer per second. The packets remained in the transmission buffer will be sent sequentially. However, after a certain packet in the early stage of retention, all of the packets are discarded as underrun by an application on the receiver side.

An object of the present invention is to provide a communication control apparatus, a wireless communication apparatus, a communication control method and a wireless communication method capable of reducing influence of retention of transmission buffer caused by deterioration of a wireless state in either a main path or a sub-path or sudden congestion of traffic.

Solution to Problem

A communication control apparatus of the present invention capable of using a plurality of different wireless communication paths for a wireless communication apparatus and controlling communication between the wireless communication apparatus and a corresponding party by compensating for an insufficient bandwidth of one wireless communication with respect to a bandwidth required by a real-time application in use by another wireless communication path, comprises:

a reception unit for receiving bandwidth information of each wireless communication path calculated on the wireless communication apparatus side from the wireless communication apparatus;

a transmission control unit for allocating a packet to the each wireless communication path based on the bandwidth information received from the reception unit and sending the packet; and a transmission ratio adding unit for adding information of a transmission ratio of the each wireless communication path to the packet to be sent by the transmission control unit.

A communication control apparatus according to the present invention capable of using a plurality of different wireless communication paths for a wireless communication apparatus and controlling communication between the wireless communication apparatus and a corresponding party by compensating for an insufficient bandwidth of one wireless communication with respect to a bandwidth required by a real-time application in use by another wireless communication path, comprises:

a reception unit for receiving a packet having added information of a transmission ratio of the each wireless communication path to be sent by the wireless communication apparatus;

a measurement unit for measuring a reception bandwidth of the each wireless communication path based on the received packet; and a notification unit for notifying the wireless communication apparatus of information about the transmission ratio of the transmission path of the wireless communication apparatus based on information of the reception bandwidth measured by the measurement unit after the reception unit has received the packet having added information of the transmission ratio.

The communication control apparatus according to an embodiment of the present invention further comprises a detection unit for detecting retention of transmission packet of the wireless communication apparatus of the each wireless transmission path based on the packet received by the reception unit, wherein the notification unit notifies so that the transmission ratio is reduced when retention of the transmission packet is detected by the detection unit.

A wireless communication apparatus according to the present invention capable of using a plurality of different wireless communication paths for a communication control apparatus and performing wireless communication with a corresponding party through the communication control apparatus by compensating for an insufficient bandwidth of one wireless communication with respect to a bandwidth required by a real-time application in use by another wireless communication path, comprises:

a reception unit for receiving bandwidth information of each wireless communication path calculated on the communication control apparatus side from the communication control apparatus;

a transmission control unit for allocating a packet to the each wireless communication path based on the bandwidth information received from the reception unit and sending the packet; and a transmission ratio adding unit for adding information of a transmission ratio of the each wireless communication path to the packet to be sent by the transmission control unit.

A wireless communication apparatus according to the present invention capable of using a plurality of different wireless communication paths for a communication control apparatus and performing wireless communication with a corresponding party through the communication control apparatus by compensating for an insufficient bandwidth of one wireless communication with respect to a bandwidth required by a real-time application in use by another wireless communication path, comprises:

a reception unit for receiving a packet having added information of a transmission ratio of the each wireless communication path to be sent by the communication control apparatus;

a measurement unit for measuring a reception bandwidth of the each wireless communication path based on the received packet; and a notification unit for notifying the communication control apparatus of information about the transmission ratio of transmission path of the communication control apparatus based on information of the reception bandwidth measured by the measurement unit after the reception unit has received the packet having added information of the transmission ratio.

The wireless communication apparatus according to an embodiment of the present invention further comprises a detection unit for detecting retention of transmission packet of the communication control apparatus of the each wireless transmission path based on the packet received by the reception unit, wherein the notification unit notifies so that the transmission ratio is reduced when retention of the transmission packet is detected by the detection unit.

A communication control method according to the present invention capable of using a plurality of different wireless communication paths for a wireless communication apparatus and controlling communication between the wireless communication apparatus and a corresponding party by compensating for an insufficient bandwidth of one wireless communication with respect to a bandwidth required by a real-time application in use by another wireless communication path, comprises the steps of:

receiving bandwidth information of each wireless communication path calculated on the wireless communication apparatus side from the wireless communication apparatus;

allocating a packet to the each wireless communication path based on the received bandwidth information and sending the packet; and adding information of a transmission ratio of the each wireless communication path to the packet to be sent.

A communication control method according to the present invention capable of using a plurality of different wireless communication paths for a wireless communication apparatus and controlling communication between the wireless communication apparatus and a corresponding party by compensating for an insufficient bandwidth of one wireless communication with respect to a bandwidth required by a real-time application in use by another wireless communication path, comprises the steps of:

receiving a packet having added information of a transmission ratio of the each wireless communication path to be sent by the wireless communication apparatus;

measuring a reception bandwidth of the each wireless communication path based on the received packet; and notifying the wireless communication apparatus of information about the transmission ratio of the transmission path based on information of the reception bandwidth measured after the packet having added information of the transmission ratio has been received.

The communication control method according to an embodiment of the present invention, wherein when retention of transmission packet of the wireless communication apparatus in the each wireless transmission path is detected, notification is made so that the transmission ratio is reduced.

A wireless communication method according to the present invention capable of using a plurality of different wireless communication paths for a communication control apparatus and performing wireless communication with a corresponding party through the communication control apparatus by compensating for an insufficient bandwidth of one wireless communication with respect to a bandwidth required by a real-time application in use by another wireless communication path, comprises the steps of:

receiving bandwidth information of each wireless communication path calculated on the communication control apparatus side from the communication control apparatus;

allocating a packet to the each wireless communication path based on the received bandwidth information and sending the packet; and adding information of a transmission ratio of the each wireless communication path to the packet to be sent.

A wireless communication method according to the present invention capable of using a plurality of different wireless communication paths for a communication control apparatus and performing wireless communication with a corresponding party through the communication control apparatus by compensating for an insufficient bandwidth of one wireless communication with respect to a bandwidth required by a real-time application in use by another wireless communication path, comprises the steps of:

receiving a packet having added information of a transmission ratio of the each wireless communication path to be sent by the communication control apparatus;

measuring a reception bandwidth of each wireless communication path based on the received packet; and notifying the communication control apparatus of information about the transmission ratio of the transmission path of the communication control apparatus based on information of the reception bandwidth measured after the packet having added information of the transmission ratio has been received.

The wireless communication method according to an embodiment of the present invention, wherein when retention of transmission packet of the communication control apparatus in the each wireless transmission path is detected, notification is made so that the transmission ratio is reduced.

Advantageous Effects on Invention

According to the present invention, it is possible to immediately measure a reception bandwidth of a wireless communication path when a packet having added information of a transmission ratio is received. Therefore it is possible to immediately respond to retention of a transmission buffer caused by deterioration of a wireless state in either a main path or a sub-path and sudden congestion of traffic. Thus the influence of retention of transmission buffer can be reduced.

BRIEF DESCRIPTION OF DRAWINGS

FIG. 6 is a flow chart of behavior according to the present embodiment.

DESCRIPTION OF EMBODIMENTS

Figure 1:
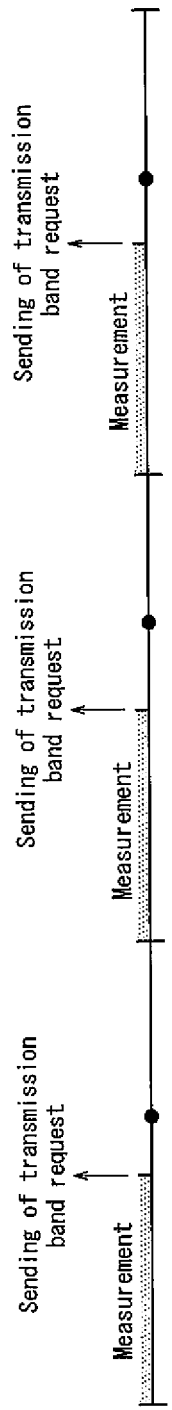
FIG. 1 is a diagram for illustrating the case where a reception bandwidth is measured and a transmission path ratio is calculated by allowing for a predetermined time after a change message has been sent.
Figure 2:
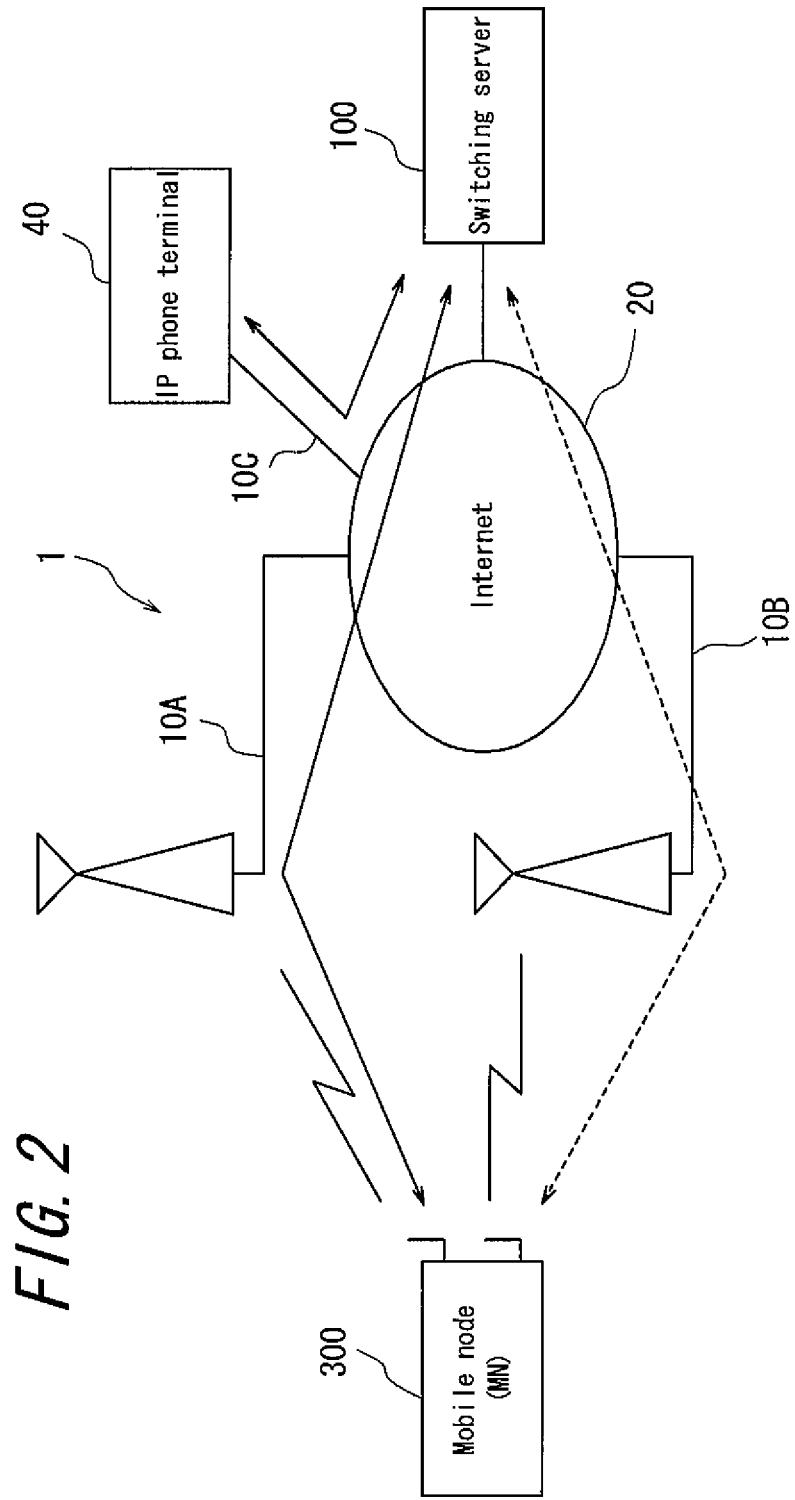
FIG. 2 is an overall schematic configuration diagram of the communication system according to the present embodiment.

A preferred embodiment of the present invention will now be described with reference to the accompanying drawings. FIG. 2 is an overall schematic configuration diagram of a communication system 1 according to the present embodiment. As shown in FIG. 2, a wireless IP network 10A and a wireless IP network 10B are included in the communication system 1. The wireless IP network 10A is an IP network that can send IP packets. In the wireless IP network 10A, based on the location of a wireless communication apparatus 300 (hereinafter referred to as MN300), a care-of IP address A1 is dynamically allocated to the MN300. In the present embodiment, the wireless IP network 10A is a cellular phone network using EDVO (specifically, HRPD of the 3GPP2 standard) as a wireless communication scheme.

The wireless IP network 10B can send IP packets in the same manner as the wireless IP network 10A. In the wireless IP network 10B, a care-of IP address A2 is allocated to the MN300. In the present embodiment, the wireless IP network 10B uses, as a wireless communication scheme, the mobile WiMAX which is in accordance with the IEEE802.16e standard.

In addition, the care-of IP address A1 is given from the wireless IP network 10A when the MN300 is connected to the wireless IP network 10A. In the same manner, the care-of IP address A2 is given from the wireless IP network 10B when the MN300 is connected to the wireless IP network 10B.

Further, in the present embodiment, the care-of IP addresses A1 and A2 are associated with a home IP address AH (virtual address).

The switching server 100 and the MN300 can perform communication by using the wireless IP networks 10A and 10B simultaneously. More specifically, the switching server 100 and the MN300 send and receive IP packets by using the wireless IP network 10A as a main path. Then, when the bandwidth (transfer rate) of the main path is insufficient, the insufficient bandwidth is compensated by a sub-path by using the wireless IP network 10B as the sub-path. It should be noted that the sub-path is not limited only to the wireless IP network 10B, but there are some cases where a plurality of available wireless IP networks are used simultaneously.

[0033] The wireless IP networks 10A and 10B are connected to the Internet 20. Then, to the Internet 20, the switching server 100 is connected. The switching server 100 constitutes a communication control apparatus that controls a wireless communication path to the MN300, and can send IP packets to the MN300 through the wireless IP network 10A, and send IP packets to the MN300 through the wireless IP network 10B as well.

The switching server 100 has a function of VPN router that performs a routing processing of IP packets. Virtualization of the third layer of OSI is realized by establishing a tunnel between the MN300 and the switching server 100 using the VPN (IPSec). Thus IP mobility of the MN300 is secured.

In other words, in the present embodiment, different from the mobile IP (e.g. RFC2002), the MN300 can perform communication with the corresponding party (specifically, an IP phone terminal 40) by using both wireless communication paths, which is, a main path set through the wireless IP network 10A and a sub-path set through the wireless IP network 10B, simultaneously.

The switching server 100 is connected to the IP phone terminal 40 through a communication network 10C connected to the Internet 20. The IP phone terminal 40 exchanges voice signals and VoIP packets mutually, and also sends and receives IP packets.

More specifically, the switching server 100 (communication control apparatus) receives IP packets (VoIP packets) sent by the MN300 (wireless communication apparatus) to the IP phone terminal 40 (corresponding party) at a predetermined cycle (20 ms) and relays the IP packets to the IP phone terminal 40, and also receives IP packets (VoIP packets) sent by the IP phone terminal 40 to the MN300 at a predetermined cycle (20 ms) and relays the IP packets to the MN300.

Next, a function block configuration of the communication system 1 is described. More specifically, a function block configuration of the switching server 100 and the MN300 included in the communication system 1 is described with reference to FIG. 3. The units relating to the present invention are mainly described hereinafter. Therefore, it should be noted that the switching server 100 and the MN300 may be provided with a logic block (power source or the like) that is essential to achieve the function as the apparatus, but the logic block is not shown and not explained herein.

Figure 3:
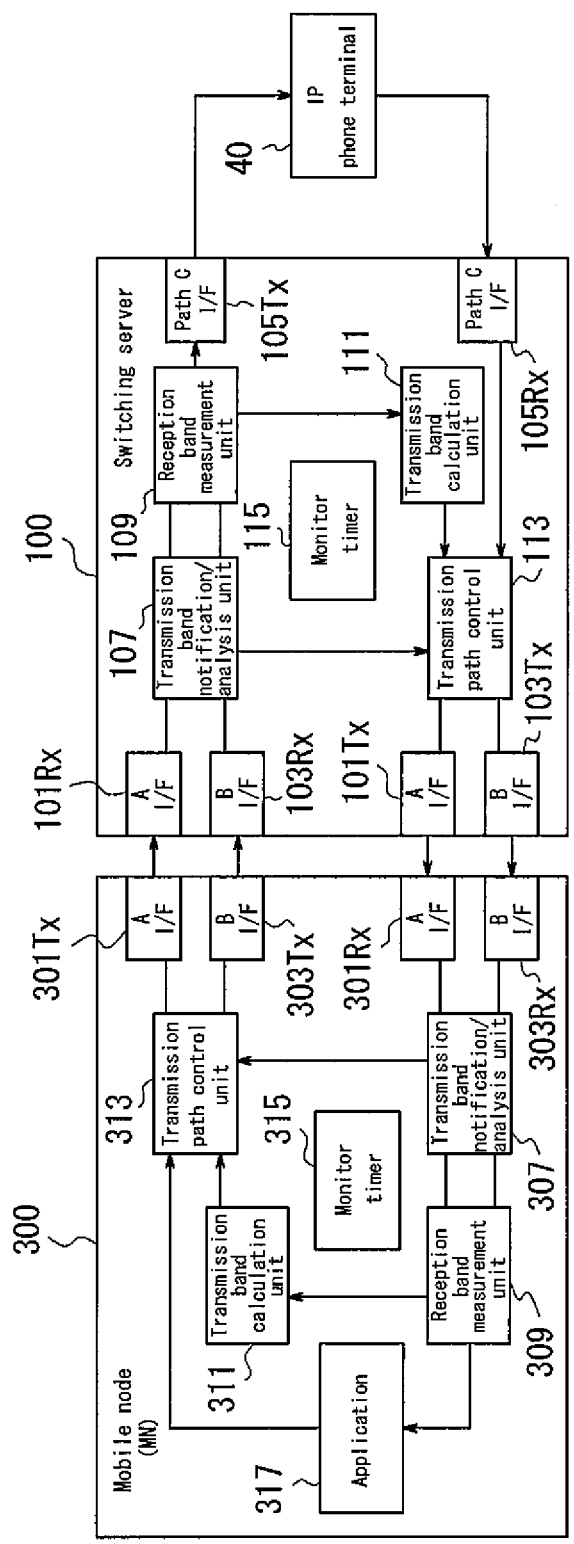
FIG. 3 is a function block diagram of the switching server and the mobile node (MN) shown in FIG. 2.

As shown in FIG. 3, the switching server 100 includes a reception interface unit (I/F A) 101Rx, a reception interface unit (I/F B) 103Rx, a reception interface unit (I/F C) 105Rx, a transmission interface unit (I/F A) 101Tx, a transmission interface unit (I/F B) 103Tx, a transmission interface unit (I/F C) 105Tx, a transmission bandwidth notification/analysis unit 107 as a reception unit and a notification unit for receiving packets having added information of a transmission ratio, a reception bandwidth measurement unit 109 as a measurement unit, a transmission bandwidth calculation unit 111, a transmission path control unit 113 as a communication control unit and a transmission ratio adding unit, and a monitor timer 115.

The reception interface unit 101Rx and the transmission interface unit 101Tx constitute a communication interface unit corresponding to the wireless IP network 10A, and are configured by, for example, 1000BASE-T defined by the IEEE802.3abandwidth connected to the Internet 20, then connected to the wireless IP network 10A.

In the same manner, the reception interface unit 103Rx and the transmission interface unit 103Tx constitute a communication interface unit corresponding to the wireless IP network 10Bandwidth are configured by, for example, 1000BASE-T defined by the IEEE802.3abandwidth connected to the Internet 20, then connected to the wireless IP network 10B.

The reception interface unit 105Rx and the transmission interface unit 105Tx constitute a communication interface unit corresponding to the communication network 10C and are connected to the Internet 20 and used for performing communication with the IP phone terminal 40.

As for the switching server 100, three IFs for a path A, a path Bandwidth a path C are indicated. However, these IFs can be indicated by one I/F. In this case, the paths A, Bandwidth C are identified respectively based on a destination address and a source address of input IP packet.

The transmission bandwidth notification/analysis unit 107 analyzes IP packets including a transmission bandwidth request, from IP packets received by the reception interface units 101Rx and 103Rx, and notifies a transmission bandwidth notified from the mobile node 300 to the transmission path control unit 113, and also monitors transmission bandwidth fields included in the received IP packets and measures the time from when the transmission bandwidth request has been sent to the mobile node 300 till when an IP packet that reflects the transmission bandwidth arrives.

The reception bandwidth measurement unit 109 measures reception bandwidths in the paths A and B based on flow rates of IP packets received by the paths A and Bandwidth notifies the transmission bandwidth calculation unit 111 of the measured reception bandwidths.

The transmission bandwidth calculation unit 111 calculates request transmission bandwidths from the mobile node 300 based on the notified reception bandwidths and notifies the transmission path control unit 113 of the calculated request transmission bandwidths. The transmission path control unit 113 sorts RTP (real-time transport protocol) packets sent through the reception interface unit 105Rx to the paths A and B based on the transmission bandwidths notified from the transmission bandwidth notification/analysis unit 111 and, when a transmission bandwidth request to be notified to the mobile node 300 is notified from the transmission bandwidth calculation unit 111, sends packets including the transmission bandwidth request to the mobile node 300 as well. The monitor timer 115 measures a measurement time of the reception bandwidth measurement unit 109.

In addition to the above mentioned functions, the switching server 100 according to the present embodiment has a function to check the order of IP packets sent and received between the MN300 and the IP phone terminal 40 through the wireless IP networks 10A and 10B by using a sequence number (SN) of RTP (real-time transport protocol) included in a VoIP packet. Further, the switching server 100 has a function to obtain statistical information (e.g. packet loss, throughput, and underrun count and overrun count of jitter-buffer) of IP packets to be relayed and to send the obtained information to the MN300.

Moreover, the switching server 100 has a function to verify a home IP address AH included in an IP packet sent by the IP phone terminal 40 with respect to a home IP address registered in a home agent (not shown) that is accessible through the Internet 20. Through this verification, it is possible to determine which telecommunication carrier allocates the home IP address AH to the MN300.

The MN300, in the same manner as the switching server 100, can perform communication by using the wireless IP networks 10A and 10B simultaneously. Explanation of the function block similar to that of the switching server 100 is arbitrarily omitted hereinafter.

As shown in FIG. 3, the MN300 includes a reception interface unit (I/F A) 301Rx, a reception interface unit (I/F B) 303Rx, a transmission interface unit (I/F A) 301Tx, a transmission interface unit (I/F B) 303Tx, a transmission bandwidth notification/analysis unit 307, a reception bandwidth measurement unit 309, a transmission bandwidth calculation unit 311, a transmission path control unit 313, a monitor timer 315 and an application 317.

The reception interface unit 301Rx and the transmission interface unit 301Tx perform wireless communication of the wireless communication scheme (I-IRPD of the 3GPP2 standard) used by the wireless IP network 10A. In the present embodiment, IP packets (VoIP packets) are sent and received to and from the IP phone terminal 40 at a predetermined cycle (e.g. 20 ms) through the wireless IP network 10A. These reception interface unit 301Rx and transmission interface unit 301Tx are embedded in the MN300 or are composed of a wireless communication card.

The reception interface unit 303Rx and the transmission interface unit 303Tx perform wireless communication that is in accordance with the wireless communication scheme (mobile WiMAX) used by the wireless IP network 10Bandwidth, in the same manner, are embedded in the MN300 or are composed of a wireless communication card.

Further, the reception interface unit 301Rx and the transmission interface unit 301Tx, and the reception interface unit 303Rx and the transmission interface unit 303Tx send and receive IP packets based on the care-of IP addresses A1 and A2 allocated to the MN300 in the wireless IP networks 10A and 10B.

In the transmission bandwidth notification/analysis unit 307, IP packets including a transmission bandwidth request is analyzed based on IP packets received by the reception interface units 301Rx and 303Rx, and a transmission bandwidth notified from the switching server 100 is notified to the transmission path control unit 313, and also transmission bandwidth fields included in the received IP packets are monitored and the time from when the transmission bandwidth request has been sent to the switching server 100 till when an IP packet that reflects the transmission bandwidth arrives is measured.

The reception bandwidth measurement unit 309 measures a reception bandwidth in the paths A and B based on a flow rate of IP packets received through the paths A and Bandwidth notifies the transmission bandwidth calculation unit 311 of the measured reception bandwidth.

The transmission bandwidth calculation unit 311 calculates a request transmission bandwidth from the switching server 100 based on the notified reception bandwidth and notifies the transmission path control unit 313 of the calculated request transmission bandwidth. The transmission path control unit 313 sorts RTP packets sent from the application 317 to the paths A and B based on the transmission bandwidth notified from the transmission bandwidth notification/analysis unit 311 and, when a transmission bandwidth request to be notified to the switching server 100 is notified from the transmission bandwidth calculation unit 311, sends packets including the transmission bandwidth request to the switching server 100 as well. The monitor timer 315 measures a measurement time of the reception bandwidth measurement unit 309.

The application 317 is assumed as a bidirectional real-time application like, for example, VoIP. In FIG. 3, the application 317 is included in the mobile node 300. However, it is possible to dispose the application 317 in an external PC (Personal Computer) or the like through the third I/F such as Ethernet (registered trademark), wireless LAN, by operating the mobile node 300 as a router.

In addition, the mobile node 300 of the present embodiment has, in the same manner as the switching server 100, a function to check the order of IP packets sent and received to and from the IP phone terminal 40 by using a sequence number (SN) of RTP included in a VoIP packet.

Figure 4:
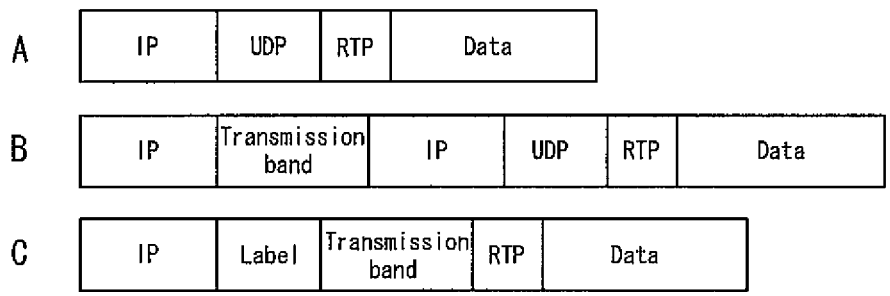
FIG. 4 is a diagram showing transmission bandwidth messages on a sender side of the mobile node and the switching server.

FIG. 4 is a diagram showing transmission bandwidth messages on the sender side of the mobile node and the switching server. Communication between the mobile node 300 (or a PC connected after the mobile node) and the IP phone terminal 40 is performed by a tunneling between the mobile node 300 and the switching server 100.

The VoIP packet before a tunneling is shown in FIG. 4A. On the sender side, when a tunneling is performed, a transmission bandwidth is included in a packet in order to notify an IP packet to be sent of the current transmission bandwidth.

FIG. 4B shows the case where a transmission bandwidth is added before an inside IP header of the tunneling. In the case of a real-time application such as VoIP, about 50 packets are sent per second. Therefore, granularity of about 0-100% of integer is sufficient for the transmission bandwidth, and even if the transmission bandwidth is added, it results in an increase in only about 1 byte at a maximum.

FIG. 4C shows the case where the inside IP header and a UDP header are replaced by a label and a transmission bandwidth. When VoIP is performed between the mobile node 300 and the IP phone terminal 40, the IP header and the UDP header don't change except for a checksum. Therefore, it is possible to obtain a reduction effect of header and to notify a transmission bandwidth as well by binding the IP header and the UDP header as a label between the switching server 100 and the mobile node 300.

Assuming that the binding information is 2 bytes, the IP header and the UDP header of 28 bytes can be compressed to the biding information and transmission bandwidth of about 3 bytes. When a UDP checksum is used, it is possible to apply load by adding further UDP checksum or by recalculating UDP checksum on the receiver side.

Here, the case where a transmission bandwidth is included in a packet on the sender side is described. However, in the same manner, a transmission bandwidth may be included in a VoIP packet on the side where a transmission bandwidth request is sent.

Figure 5:
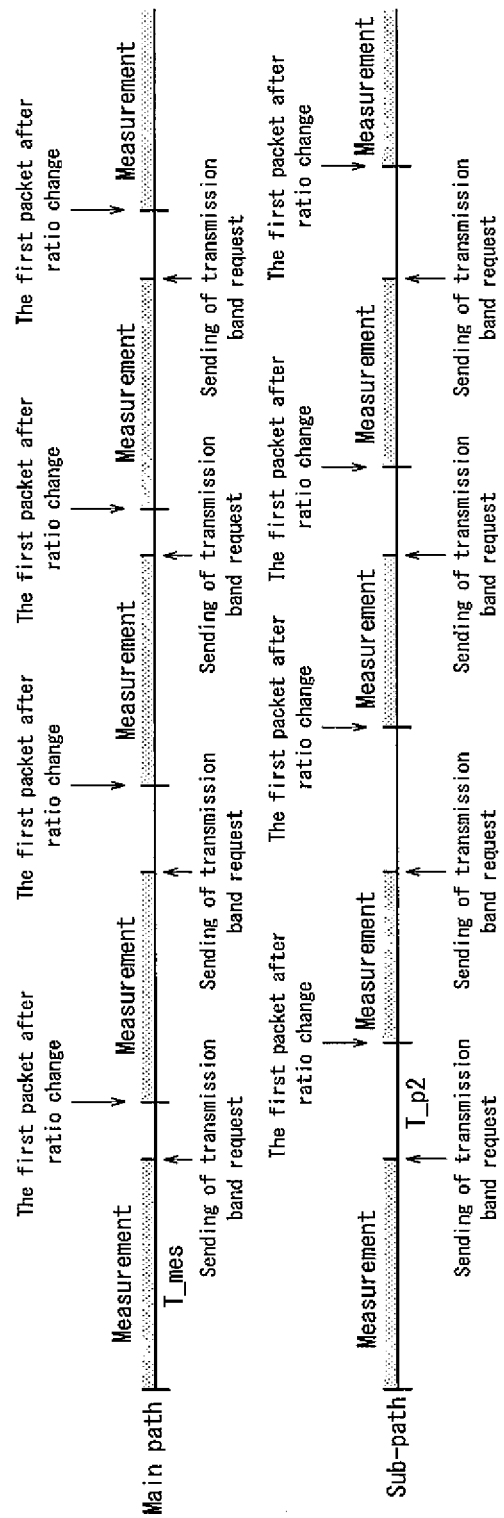
FIG. 5 is a diagram for illustrating a measurement interval of a bandwidth measurement time of a main path and a sub-path.

FIG. 5 is a diagram for illustrating measurement intervals of bandwidth measurement time on the main path and the sub-path. In the main path (e.g. path A), the reception bandwidth measurement units 109 and 309 measure respectively a reception bandwidth during the time of T_mes. Then the transmission path control units 113 and 313 send respectively a transmission bandwidth request to the mobile node 300 or the switching server 100.

After that, on the main path, when an IP packet complying with the transmission bandwidth request arrives at the switching server 100 or the mobile node 300 in the time T_p1 after the transmission bandwidth request has been sent, the reception bandwidth measurement units 109 and 309 measure respectively again the reception bandwidth for the time of T_mes from the time when the IP packet has arrived, then based on the measurement result, send a transmission bandwidth request to the mobile node 300 or the switching server 100.

When a different wireless system is used, since generally RTT, communication bandwidth or the like are different between the main path and the sub-path, with respect to the sub-path (e.g. path B), the time of T_p2 from when a transmission bandwidth request has been sent to the switching server 100 or the mobile node 300 till when the first IP packet complying with a new transmission ratio arrives is different from the time of T_p1. With respect to the sub-path, after the first IP packet sent at a new ratio has been received by the switching server 100 or the mobile node 300, the reception bandwidth measurement units 109 and 309 measure respectively a reception bandwidth only for the time period of T_mes-(T_p2-T_p1).

The transmission bandwidth request is performed either through the main path or the sub-path or both of them. On the side where a transmission is performed, when transmission is performed at a transmission ratio directed by the receiver side, by including the transmission ratio in a transmission packet, it is possible to immediately measure a reception bandwidth when reception at a new transmission ratio can be performed. Therefore, time waste does not occur from when a transmission ratio has actually been changed till when the reception bandwidth is measured. Thus it is possible to immediately respond to the case where a traffic state suddenly changes.

FIG. 6 is a flow chart of behavior of the present embodiment. In this case, a state where no packet retention has occurred both in the main path and the sub-path is assumed as a normal state.

At first, the normal state is described. In FIG. 6(*a*), a transmission bandwidth request (BW_req_1 for the main path and BW_req_2 for the sub-path) is sent to the corresponding party (the switching server 100 or the mobile node 300) in the normal state (step S1). Then a process is started by setting a timer of each path to t_1=0 and t_2=0. Then the process transits to FIGS. 6(*b*) and (*c*) (step S2). Here, FIG. 6(*a*) shows a process of the main path and FIG. 6(*c*) shows a process of the sub-path.

In FIG. 6(*b*), determination of whether a packet sent at a ratio of BW_req_1 has been received or not is made (step S101). Then, when the packet has been received, measurement of a reception bandwidth is started in the main path, and after the passage of measurement period of T_mes, the main path is determined as a normal state, then the process transits to FIG. 6(*d*) (step S102).

FIG. 6(*c*) shows a process of the sub-path, in which determination of whether a packet sent at a ratio of BW_req_2 has been received or not is made (step S201). Then, when the packet has been received, measurement of a reception bandwidth is started in the sub-path, and after the passage of a measurement period of T_mes-(tp1-tp2), the sub-path is determined as a normal state, then the process transits to FIG. 6(*d*) (step S202).

In FIG. 6(*d*), the process waits for both the main path and the sub-path to finish in a normal state (step S301). Then when the process transits to FIG. 6(*d*) under the state where the main path and the sub-path are in a normal state, the values of the transmission bandwidth request of BW_req_1' and BW req_2' are calculated respectively by the main path and the sub-path based on the reception bandwidth measured during the measurement (step S302), and these values of the transmission bandwidth request of BW_req_1' and BW_req_2' are sent to the corresponding party (step S303). Then the process returns to FIGS. 6(*b*) and (*c*) by resetting the timer of the main path and the sub-path (step S304). Thus, in the case of the normal state, the above mentioned behavior is repeated.

Next, the case where retention occurs either in the main path or the sub-path is described. When a packet sent at a ratio of BW_req_1 is not received in step S101 of FIG. 6(*b*), whether the time t1 from when a transmission bandwidth request has been sent till the present time exceeds a threshold of t_thresh_1 of the main path or not is determined (step S103). When exceeding the threshold oft thresh_1, it is assumed that retention has occurred. Then a transmission request of the main path is reduced to the first value except for zero, for example, 1% (BW_req_1"=1%), and the process transits to FIG. 6(*e*) (step S104). On the other hand, when not exceeding the threshold of t_thresh_1, the process returns to step S101.

When a packet sent at a ratio of BW_req_2 is not received in step S201 of FIG. 6(*c*), whether the time t2 from when a transmission bandwidth request has been sent till the present time exceeds a threshold of t thresh_2 of the main path or not is determined (step S203). When exceeding the threshold of t_thresh_2, it is assumed that retention has occurred. Then a transmission request of the sub-path is reduced to 1% (BW_req_2"=1%), and the process transits to FIG. 6(*e*) (step S204). On the other hand, when not exceeding the threshold of t thresh 2, the process returns to step S201.

When transition from either FIGS. 6(*b*) or (*c*) to FIG. 6(*e*) has occurred, in FIG. 6(*e*), the bandwidth of the path that is not a transition source (the path where retention has not occurred) is defined as a calculation value that has been calculated recently (step S401), then a transmission bandwidth request (BW_req_1" or BWreq_2") is sent to the corresponding party (step S402), and the timer is reset (step S403).

After that, whether the transition source (the path where retention has occurred) is the main path or the sub-path is determined (step S404). When the transition source is the main path, the process transits to FIGS. 6(*c*) and (*f*) (step S405). Then when the transition source is the sub-path, the process transits to FIG. 6(*b*) and (1) (step S406).

In FIG. 6(*f*), reception of a packet sent at a transmission bandwidth request of 1% is monitored on the path side where retention has occurred (step S501). When the packet is received without exceeding t limit N, whether the transition source is the main path or the sub-path is determined (step S503). When the path where retention has occurred is the main path, a transmission bandwidth request of BW_req_1 is set to the second value that is greater than the first value, for example, 2% and the timer is reset (t_1=0), then the process transits to FIG. 6(*b*) (step S504). On the other hand, when the path where retention has occurred is the sub-path, a transmission bandwidth request of BW_req_2 is set to 2% and the timer is reset (t_2=0), then the process transits to FIG. 6(*c*) (step S505). In this case, with respect to the path where retention has not occurred, the process is in FIG. 6(*b*) or FIG. 6(*c*) at this point.

With respect to the path where retention has occurred, the process waits for reception of a packet sent at a bandwidth request of 2%. Then when the time until the packet is received (t1 or t2) is equal to or less than t_thresh_1 or t_thresh_2, it is determined that the retention has been solved and the state has returned to the normal state. Then after that, the process returns to the normal state (step S502). On the other hand, when the time t_thresh_1 or t_thresh_2 has passed without receiving the packet sent at a bandwidth request of 2% (step S502), it is determined that the path is still in a retention state and the process transits again to FIG. 6(*e*) (step S506).

The times of t_thresh_1, t_thresh_2, t_limit_1 and t_limit_2 may be values that are determined by parameter, or it is possible that only an initial value (e.g. 100 ms) is given, and that the following values are values that are determined by taking statistics of the actual arrival times.

As described above, by immediately sending packets including a transmission bandwidth request of 1% and packets including a transmission bandwidth request of 2% alternately to the path where retention has occurred, it is possible to measure the time from when a transmission request is performed by the packet till the time of its reception, and only minimum transmission (assuming that 50 packets are sent per second, a ratio of one packet per second in both cases where a transmission bandwidth request is 1% and 2%) to the transmission buffer where retention has occurred is performed, it is possible to minimize the influence of retention and to minimize the packets accompanied by a substantial delay caused by retention as well.

The present invention is not limited to the above mentioned embodiment, but many modifications and changes are available. For example, the wireless IP networks 10A and 10B are included in the communication system 1. However, more wireless IP networks may be used. In addition, in the above mentioned embodiment, an insufficient transmission bandwidth is compensated for both upward and downward directions, however, it can be either upward or downward direction. Further, as for a sending path for a change message of transmission path ratio, if an unused wireless communication path is available, this path may be used.

In addition, the case where packets including a transmission bandwidth request of 1% and packets including a transmission bandwidth request of 2% are sent alternately is described in the above mentioned embodiment, the ratio of the transmission bandwidth requests may be other combinations (e.g. 2% and 3%).

CROSS REFERENCE TO RELATED APPLICATION

This application is a national stage of international application no. PCT/JP2007/072965, filed on Nov. 28, 2007, and claims the benefit of priority under 35 USC 119 of Japanese Patent Application No. 2006-322179, filed on Nov. 29, 2006, the entire contents of which are incorporated herein by reference.

The invention claimed is:

1. A communication control apparatus configured to use a plurality of different wireless communication paths for a wireless communication apparatus and controlling communication between the wireless communication apparatus and a corresponding party via the different wireless communication paths by the communication control apparatus compensating for an insufficient bandwidth of one wireless communication path by another wireless communication path among the plurality of wireless communication paths, the communication control apparatus comprising:
   a reception unit of the communication control apparatus for receiving bandwidth information of the wireless communication paths calculated by the wireless communication apparatus from the wireless communication apparatus;
   a transmission control unit for allocating packets, which are part of the communication between the wireless communication apparatus and the corresponding party, between the wireless communication paths based on the bandwidth information received from the reception unit and sending the packets; and
   a transmission ratio adding unit for adding information of a transmission ratio of the wireless communication paths to the packets to be sent by the transmission control unit.

2. A communication control apparatus configured to use a plurality of different wireless communication paths for a wireless communication apparatus and controlling communication between the wireless communication apparatus and a corresponding party via the different wireless communication paths by the communication control apparatus compensating for an insufficient bandwidth of one wireless communication path by another wireless communication path among the plurality of wireless communication paths, the communication control apparatus comprising:
   a reception unit for receiving packets, which are part of the communication between the wireless communication apparatus and the corresponding party, having added information of a transmission ratio of the wireless communication paths to be sent by the wireless communication apparatus;
   a measurement unit for measuring a reception bandwidth at the communication control apparatus of the wireless communication paths based on the received packets; and
   a notification unit for notifying the wireless communication apparatus of information about the transmission ratio of the transmission paths of the wireless communication apparatus based on information of the reception bandwidth measured by the measurement unit after the reception unit has received the packets having added information of the transmission ratio.

3. The communication control apparatus according to claim 2, further comprising a detection unit for detecting retention of transmission packets of the wireless communication apparatus of the wireless transmission paths based on the packets received by the reception unit, wherein the notification unit notifies so that the transmission ratio is reduced when retention of the transmission packets is detected by the detection unit.

4. A wireless communication apparatus configured to use a plurality of different wireless communication paths for a communication control apparatus and performing wireless communication with a corresponding party through the communication control apparatus via the different wireless communication paths by compensating for an insufficient bandwidth of one wireless communication path by another wireless communication path among the plurality of wireless communication paths, the wireless communication apparatus comprising:
   a reception unit of the wireless communication apparatus for receiving bandwidth information of the wireless communication paths calculated by the communication control apparatus from the communication control apparatus;
   a transmission control unit for allocating packets, which are part of the communication between the wireless communication apparatus and the corresponding party, between the wireless communication paths based on the bandwidth information received from the reception unit and sending the packets; and
   a transmission ratio adding unit for adding information of a transmission ratio of the wireless communication paths to the packets to be sent by the transmission control unit.

5. A wireless communication apparatus configured to use a plurality of different wireless communication paths for a communication control apparatus and performing wireless communication with a corresponding party through the communication control apparatus via the different wireless communication paths by compensating for an insufficient bandwidth of one wireless communication path by another wireless communication path among the plurality of wireless communication paths, the wireless communication apparatus comprising:
   a reception unit of the wireless communication apparatus for receiving packets, which are part of the communication between the wireless communication apparatus and the corresponding party, having added information of a transmission ratio of the wireless communication paths to be sent by the communication control apparatus;
   a measurement unit for measuring a reception bandwidth of the wireless communication paths based on the received packets; and
   a notification unit for notifying the communication control apparatus of information about the transmission ratio of transmission paths of the communication control apparatus based on information of the reception bandwidth measured by the measurement unit after the reception unit has received the packets having added information of the transmission ratio.

6. The wireless communication apparatus according to claim 5, further comprising a detection unit for detecting retention of transmission packets of the communication control apparatus of the wireless transmission paths based on the packets received by the reception unit, wherein the notification unit notifies so that the transmission ratio is reduced when retention of the transmission packets is detected by the detection unit.

7. A communication control method configured to use a plurality of different wireless communication paths for a wireless communication apparatus and controlling communication between the wireless communication apparatus and a corresponding party via the different wireless communication paths by a communication control apparatus compensating for an insufficient bandwidth of one wireless communication path by another wireless communication path among the plurality of wireless communication paths, comprising the steps of:
- receiving, at the communication control apparatus, bandwidth information of the wireless communication paths calculated by the wireless communication apparatus from the wireless communication apparatus;
- allocating packets, which are part of the communication between the wireless communication apparatus and the corresponding party, between the wireless communication paths based on the received bandwidth information and sending the packets; and
- adding information of a transmission ratio of the wireless communication paths to the packets to be sent.

8. A communication control method configured to use a plurality of different wireless communication paths for a wireless communication apparatus and controlling communication between the wireless communication apparatus and a corresponding party via the different wireless communication paths by a communication control apparatus compensating for an insufficient bandwidth of one wireless communication path by another wireless communication path among the plurality of wireless communication paths, comprising the steps of:
- receiving packets, which are part of the communication between the wireless communication apparatus and the corresponding party, having added information of a transmission ratio of the wireless communication paths to be sent by the wireless communication apparatus;
- measuring a reception bandwidth at the communication control apparatus of the wireless communication paths based on the received packets; and
- notifying the wireless communication apparatus of information about the transmission ratio of the transmission paths based on information of the reception bandwidth measured after the packets having added information of the transmission ratio have been received.

9. The communication control method according to claim 8, wherein when retention of transmission packets of the wireless communication apparatus in the wireless transmission paths is detected, notification is made so that the transmission ratio is reduced.

10. A wireless communication method configured to use a plurality of different wireless communication paths for a communication control apparatus and performing wireless communication with a corresponding party through a communication control apparatus via the different wireless communication paths by compensating for an insufficient bandwidth of one wireless communication path by another wireless communication path among the plurality of wireless communication paths, comprising the steps of:
- receiving, at a wireless communication apparatus, bandwidth information of the wireless communication paths calculated by the communication control apparatus from the communication control apparatus;
- allocating packets, which are part of the communication between the wireless communication apparatus and the corresponding party, to the wireless communication paths based on the received bandwidth information and sending the packets; and
- adding information of a transmission ratio of the wireless communication paths to the packets to be sent.

11. A wireless communication method configured to use a plurality of different wireless communication paths for a communication control apparatus and performing wireless communication with a corresponding party through the communication control apparatus via the different wireless communication paths by compensating for an insufficient bandwidth of one wireless communication path by another wireless communication path among the plurality of wireless communication paths, comprising the steps of:
- receiving packets at the wireless communication apparatus, which are part of the communication between the wireless communication apparatus and the corresponding party, having added information of a transmission ratio of the wireless communication paths to be sent by the communication control apparatus;
- measuring a reception bandwidth of the wireless communication paths based on the received packets; and
- notifying the communication control apparatus of information about the transmission ratio of the transmission paths of the communication control apparatus based on information of the reception bandwidth measured after the packets having added information of the transmission ratio have been received.

12. The wireless communication method according to claim 11, wherein when retention of transmission packets of the communication control apparatus in the wireless transmission paths is detected, notification is made so that the transmission ratio is reduced.

* * * * *